(12) United States Patent
Suckle

(10) Patent No.: US 8,453,981 B2
(45) Date of Patent: Jun. 4, 2013

(54) MULTI-PIECE STAND FOR MOBILE COMPUTING DEVICE

(75) Inventor: Mitchell Suckle, Long Beach, CA (US)

(73) Assignee: Belkin International, Inc., Playa Vista, CA (US)

(*) Notice: Subject to any disclaimer, the term of this patent is extended or adjusted under 35 U.S.C. 154(b) by 229 days.

(21) Appl. No.: 12/905,074

(22) Filed: Oct. 14, 2010

(65) Prior Publication Data

US 2011/0084182 A1  Apr. 14, 2011

Related U.S. Application Data

(60) Provisional application No. 61/251,626, filed on Oct. 14, 2009.

(51) Int. Cl.
| A45D 19/04 | (2006.01) |
| A47J 47/16 | (2006.01) |
| F16M 11/00 | (2006.01) |
| A47B 19/00 | (2006.01) |
| A47B 23/00 | (2006.01) |
| A47B 97/04 | (2006.01) |
| G06F 1/16 | (2006.01) |
| H05K 5/00 | (2006.01) |
| H05K 7/00 | (2006.01) |

(52) U.S. Cl.
USPC .......................................................... 248/127

(58) Field of Classification Search
USPC ................. 248/108, 121, 127, 918, 158, 160, 248/371, 188.8, 176.1, 361, 460, 441.1, 220.1, 248/220.22; 108/1, 150; 403/202, 220–227, 403/292
See application file for complete search history.

(56) References Cited

U.S. PATENT DOCUMENTS

| 2,639,114 | A | * | 5/1953 | Allen ............................. 248/167 |
| 5,079,860 | A | * | 1/1992 | Nugent .......................... 40/780 |
| 5,358,208 | A | * | 10/1994 | Moseley et al. ............ 248/441.1 |
| 6,237,771 | B1 | * | 5/2001 | Haq ............................. 206/454 |
| 7,219,940 | B2 | * | 5/2007 | Huang ....................... 296/37.12 |
| 2003/0103328 | A1 | | 6/2003 | Hillis et al. |
| 2005/0274852 | A1 | | 12/2005 | Saez et al. |
| 2006/0158836 | A1 | | 7/2006 | Phillips |

OTHER PUBLICATIONS

PCT Application No. PCT.US10/52764 International Search Report and Written Opinion, 9 pages. Dec. 3, 2010.

* cited by examiner

*Primary Examiner* — Joshua J Michener
*Assistant Examiner* — Muhammad Ijaz
(74) *Attorney, Agent, or Firm* — Bryan Cave LLP

(57) ABSTRACT

Some embodiments teach a computing device accessory for a computing device. The computing device accessory can include: (a) a base having: (1) a base plate configured to rest on a surface; and (2) a base rear support coupled to the base plate at a first angle; (b) a top support having: (1) a top plate; and (2) a top rear support coupled to the top plate at a second angle; and (c) a connector collar configured to removably couple to the base rear support of the base and the top rear support of the top support. The top support can be configured to support the computing device such that the computing device is operable by a user when the base plate rests on the surface, the base rear support of the base and the top rear support of the top support are coupled to the connector collar. Other embodiments and methods are also disclosed herein.

22 Claims, 13 Drawing Sheets

MULTI-PIECE STAND FOR MOBILE COMPUTING DEVICE

CROSS REFERENCE TO RELATED APPLICATION

This application claims priority to U.S. Provisional Patent Application 61/251,626 filed on Oct. 14, 2009, the contents of which are incorporated herein by reference.

FIELD OF THE INVENTION

The invention relates generally to a positioning accessory for a laptop computer and, more particularly, to a collapsible, raised platform for positioning a laptop computer spatially above a user's operating surface and angling the keyboard of the computer toward the user and including apparatuses and related methods thereto.

BACKGROUND

The personal computer market has changed dramatically in the past several years with the majority of personal computer users migrating to mobile computing devices (e.g., laptop/net book computing devices). With this migration to mobile computing devices, new accessories have been developed and manufactured to increase the user experience of these devices.

Improvements in mobile computing devices have resulted in the mobile computing devices becoming smaller in size. Some disadvantages of the size reductions of the mobile computing devices include heat dissipation. As the thickness of mobile computing device cases becomes thinner, heat is transferred to the outside of the mobile computing device case in more locations. Therefore, exposing portions of the underside of the portable computing device case to ambient air may improve the overall thermal performance of the mobile computing device.

Additionally, reduction in the overall size of the mobile computing device may cause the viewing screen and the keyboard to reside in suboptimal positioning. Consequently and as described above, a user seated at a work desk (or some such other work area) may experience a less than optimal user experience when attempting to operate the mobile computing device. Also, due to the fact that mobile computing devices are by their very nature mobile, a user may appreciate a mobile computing device stand that is easy to remove from the aforementioned work desk. Therefore, a need exists in the art to develop a mobile computing device stand that will provide an improved user experience.

BRIEF DESCRIPTION OF THE DRAWINGS

The invention will be better understood from a reading of the following detailed description of examples of embodiments, taken in conjunction with the accompanying figures in the drawings in which.

Figure 1:
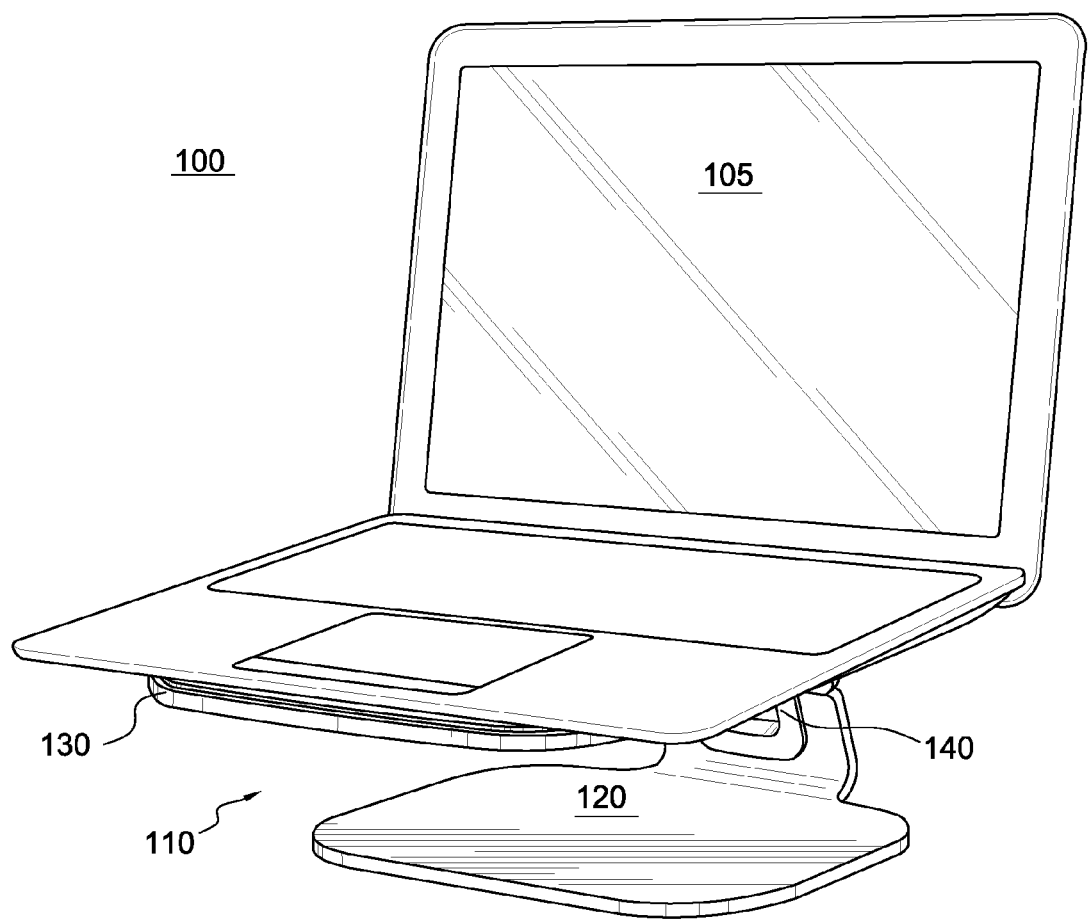
FIG. 1 is a three-quarter front view illustrating an embodiment of an exemplary system for supporting a mobile computing device at a specific height, in accordance with the subject matter described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

In some examples, a portable computing device stand can include: (a) a base including at least three side edges and a first folded edge opposed to the at least three side edges and extending outward from the base, the first folded edge defining a base rear support that having a first cutout portion removed from the base rear support, the first folded edge including two or more base supporting edge portions and a base securing edge portion, the base securing edge portion defined by the first cutout portion of the base rear support; (b) a top support including at least three side edges and a second folded edge opposed to the at least three side edges and extending outward from the top support, the second folded edge defining a top rear support that includes a second cutout portion removed from the top rear support; the second folded edge including two or more top support edge portions and a top securing edge portion, the top securing edge portion defined by the second cutout portion of the top rear support; and (c) a connection collar including a top portion and a bottom portion, the top portion of the connection collar configured to couple to the first cutout portion of the base, the bottom portion of the connection collar configured to couple to the second cutout portion of the top support, the connection collar configured to include an exterior leading edge defining a circumference of the connection collar, the exterior leading edge having an interior securing edge portion configured to abut the base securing edge of the base rear support and the top securing edge of the top rear support, the exterior leading edge additionally having two or more exterior support edge portions that extend away from the interior securing edge portion and are configured to be located around a part of the first folded edge and a part of the second folded edge. In some examples, the first folded edge can be one of the at least three side edges of the base. In other examples, the first folded edge is in addition to the at least three side edges of the base.

In some examples, the top support can include a substantially flat ring. The substantially flat ring can have a ring cutout portion removed from a center portion of the substantially flat ring. The substantially flat ring can have a rectangular shape.

The base additionally can include an upper surface and a lower surface opposite the upper surface. The upper surface and the lower surface of the base can be adjacent to the at least three side edges of the base. The lower surface of the base can be coupled to two or more support pads. In various embodiments, the base rear support can be configured at an angle in a range of approximately 70 degrees to approximately 80 degrees with respect to one or more edges of the at least three side edges of the base.

In the same or different embodiments, the top support additionally can include a top surface and a bottom surface opposite the top surface. The upper surface and the lower surface of the top support can be adjacent to the at least three side edges of the top support. The lower surface of the top support can be coupled to a support ring. The top rear support can be configured at an angle in a range of approximately 100 degrees to approximately 110 degrees with respect to one or more edges of the at least three side edges of the top support.

In many examples, the base and the top support can comprise at least one of: sheet aluminum, sheet steel, die aluminum, bamboo, a wood product, a reinforced plastic, or a polycarbonate. The connection collar can comprise at least one of: die cast zinc, die cast aluminum, a polycarbonate, a thermoplastic polyurethane, or a glass-filled plastic.

Some embodiments teach a computing device accessory for a computing device. The computing device accessory can include: (a) a base having: (1) a base plate configured to rest on a surface; and (2) a base rear support coupled to the base plate at a first angle; (b) a top support having: (1) a top plate; and (2) a top rear support coupled to the top plate at a second angle; and (c) a connector collar configured to removably couple to the base rear support of the base and the top rear support of the top support. The top support can be configured to support the computing device such that the computing device is operable by a user when the base plate rests on the surface, the base rear support of the base and the top rear support of the top support are coupled to the connector collar.

Additional embodiments teach a method of using a portable computing device stand. The portable computing device stand can include a base portion, a top section, and a connector collar. The method can include: (a) placing the base portion of the portable computing device stand on a flat surface; (b) mating a first portion of the connector collar of the portable computing device stand to a portion of the base of the portable computing device stand; (c) mating a portion of the top support portion of the portable computing device stand to a second portion of the connector collar of the portable computing device stand; and (d) placing a mobile computing device on the top support portion of the portable computing device stand.

FIG. 1 is a three-quarter front view illustrating an embodiment of an exemplary system 100 for supporting a mobile computing device 105 at a predetermined height. System 100 is merely exemplary and is not limited to the embodiments presented herein. System 100 can be employed in many different embodiments or examples not specifically depicted or described herein.

In FIG. 1, system 100 includes a multi-piece stand 110 and a mobile computing device 105. In some examples, computing device 105 can be a laptop computing device, a notebook computing device, a tablet computing device, and/or the like. In the embodiment illustrated in FIG. 1, multi-piece stand 110 includes: (a) a base 120; (b) a top support 130; and (c) a connector collar 140. In operation, multi-piece stand 110 is configured to support mobile computing device 105 by placing base 120 onto a supporting surface (i.e., a desktop), mechanically coupling connector collar 140 to a portion of base 120, and mechanically coupling a portion of top support 130 to another portion of connector collar 140. After assembling multi-piece stand 110, computing device 105 can be placed on top support 130.

Figure 2:
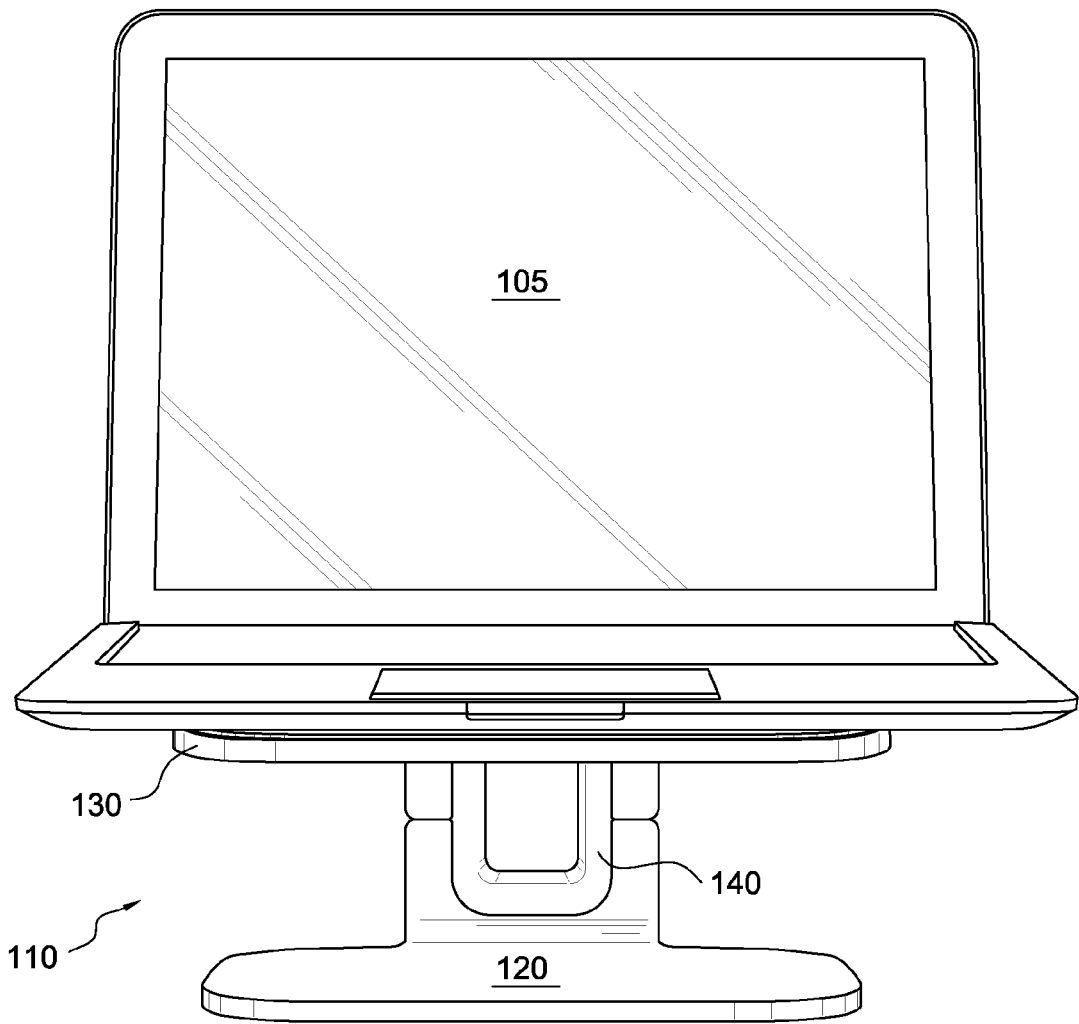
FIG. 2 is a frontal view illustrating another embodiment of the exemplary system of FIG. 1, in accordance with the subject matter described herein.

FIG. 2 is a frontal view illustrating an embodiment of exemplary system 200 for supporting a mobile computing device. In FIG. 2, system 200 includes a multi-piece stand 110 and a mobile computing device 105. In the embodiment illustrated in FIG. 2, multi-piece stand 110 includes a base 120, a top support 130, and a connector collar 140. Elements numbered substantially similar to elements in FIG. 1 above perform in a substantially similar way. Base 120 is further detailed in relation to FIGS. 5 and 6, top support 130 is further detailed in relation to FIG. 7, and connector collar 140 is further detailed in relation to FIGS. 8 and 9.

Figure 3:
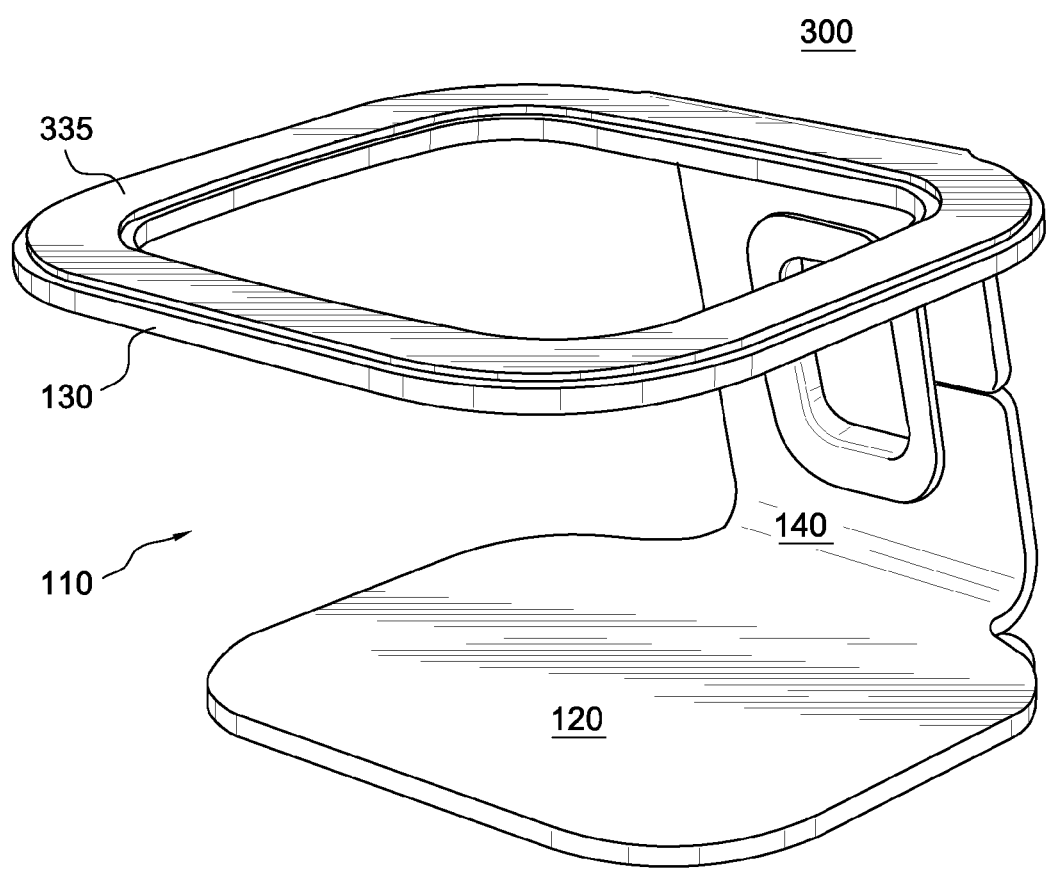
FIG. 3 is a three-quarter front view illustrating another embodiment of an exemplary system, in accordance with the subject matter described herein.

FIG. 3 is a three-quarter front view illustrating an embodiment of an exemplary system 300 for supporting a mobile computing device (not shown). In some embodiments, system 300 includes a multi-piece stand 110 configured to support a mobile computing device (not shown) at a specific height. In the embodiment illustrated in FIG. 3, multi-piece stand 110 includes a base 120, a top support 130, and a connector collar 140. In other embodiments, top support 130 additionally includes support ring 335. Support ring 335 can be manufactured from any suitable materials, such as, for example molded or die cut plastic (e.g., polycarbonate and the like), rubber, cast metals (e.g., die cast zinc), die cast aluminum and the like or any such other suitable materials. Elements numbered substantially similar to elements in FIGS. 1 and 2 above perform in a substantially similar way. Multi-piece stand 110 can be manufactured to various heights as well as various material thicknesses. In some embodiments, multi-piece stand 110 has a height of 124 mm (millimeters) from the bottom of base 120 to the highest portion of top support 130 nearest connector collar 140. In other embodiments, each of base 120 top support 130 and connector collar 140 is manufactured to have a material thickness of 5 mm. In other examples, multi-piece stand 110 can be configured to have adjustable height.

Figure 4:
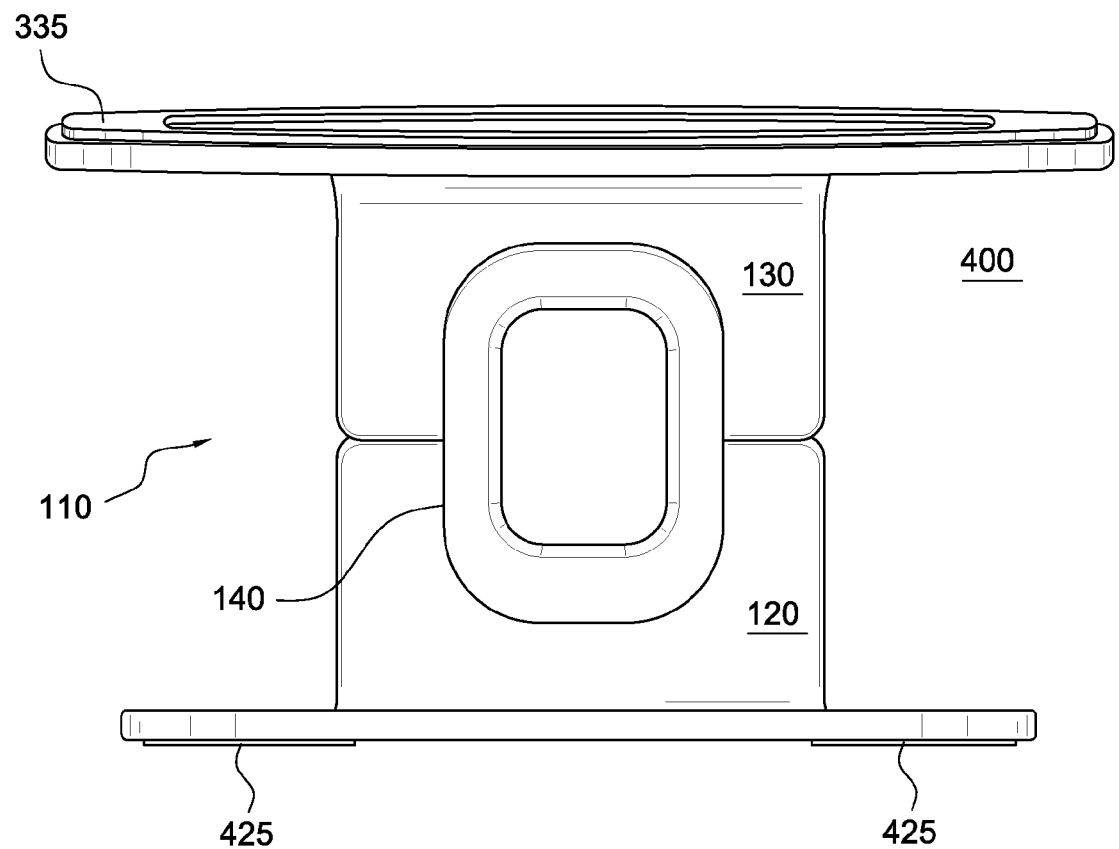
FIG. 4 is a frontal view illustrating an embodiment of the exemplary system of FIG. 3, in accordance with the subject matter described herein.

FIG. 4 is a frontal view illustrating an embodiment of an exemplary system 400 for supporting a mobile computing device (not shown). In FIG. 4, base 120 of multi-piece stand 110 additionally includes one or more support pads 425. Support pads 425 can be manufactured from any suitable materials, such as, for example molded or die cut plastic (e.g., polycarbonate and the like), Thermoplastic polyurethanes (TPU), silicon or rubber, cast metals (e.g., die cast zinc, die cast aluminum and the like) or any such other suitable materials. Elements numbered substantially similar to elements in FIGS. 1-3 above perform in a substantially similar way. In some examples, support pads can be located on base 120 such that support pads 425 rest on the supporting surface (i.e., a desktop), when multi-piece stand 110 is resting on the support surface). Support pads 425 can be configured to raise the computing device stand incrementally above a support surface.

Figure 5:
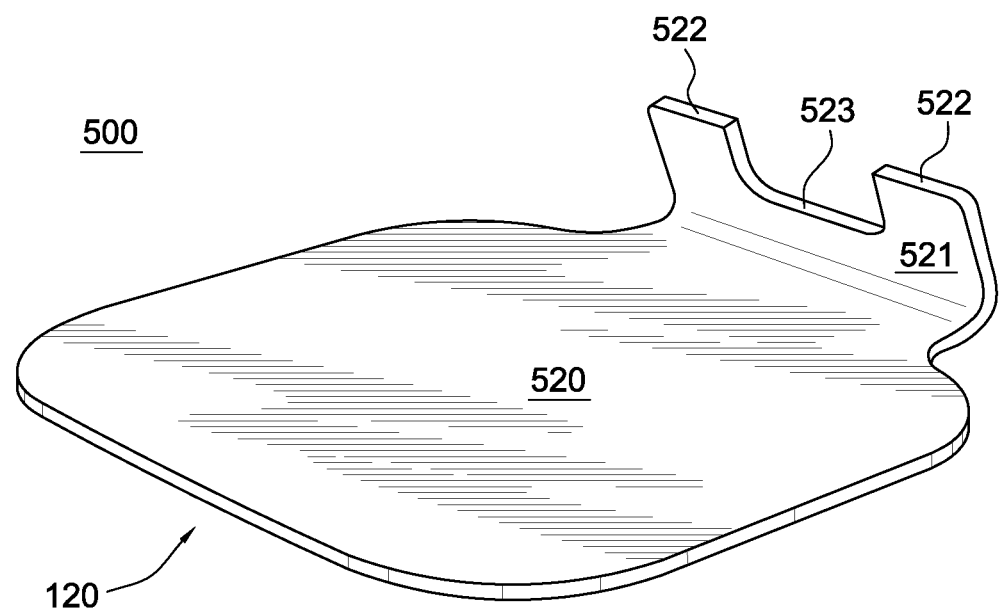
FIG. 5 is an isometric top-down view illustrating an embodiment of a base portion of the exemplary systems of FIGS. 1-4, in accordance with the subject matter described herein.

FIG. 5 is an isometric top-down view illustrating an embodiment of a base portion 500. Base portion 500 is merely exemplary and is not limited to the embodiments presented herein. Base portion 500 can be employed in many different embodiments or examples not specifically depicted or described herein.

In the embodiment illustrated in FIG. 5, base 120 is a portion of multi-piece stand 110 (described in FIGS. 1-4, above). Base 120 can include: (a) a base plate 520 and (b) a base rear support 521. In these embodiments, base rear support 521 can include: (a) two or more base support edges 522; and (b) at least one base securing edge 523. Base support edges 522 and base securing edge 523 can be formed along the leading edge of base rear support 521 opposite base plate 520.

In various embodiments, base rear support 521 can be configured as an upwardly angled flange of base plate 520. For example, base rear support 521 is configured as a flange that is upwardly angled at angle between approximately 70 and approximately 80 degrees, such as, at 74 degrees. Base support edges 522 can be spaced apart from each other such that a portion of connector collar 140 can be coupled to base securing edge 523 therebetween. For example, base rear support 521 can have a U-shape. In other examples, base rear support 521 can have other shapes.

Base rear support 521 can be configured to couple to connector collar 140 and top support 130. For example, base rear support 521 can be configured so as to allow a mating of base support edges 522 to an associated top support edges of top support 130 while base securing edge 523 is mated to connector collar 140. In these embodiments, base rear support 521 is formed as a flange that is upwardly angled and having the base securing edge 523 formed along, excised from and in physical communication with base support edges 522 so as to allow a mating with a lower portion of connector collar 140 (described in FIGS. 8 and 9, below).

In other examples, base support edges 522 can include a coupling mechanism (snaps, adhesive, pins, Velcro®, protrusions, groove(s), etc.) that can be coupled to a complementary coupling mechanism on top support 130 to secure base 120 to top support 130. Similarly, base securing edge 523 can include a coupling mechanism that can be coupled to a complementary coupling mechanism on connector collar 140.

In many embodiments, base rear support 521 is integrally formed with base plate 520. For example, base rear support 521 is formed from the same piece or type of material as base plate 520. Base 120 can be manufactured to have various lengths and widths. In some embodiments, base 120 has a length of 190 mm from the front of base 120 to the back of base 120, nearest connector collar 140.

In some embodiments, base plate 520 and base rear support 521 can be manufactured from any number of sheet or cast metals including sheet aluminum, sheet steel, die aluminum and the like. In other embodiments, base plate 520 and base rear support 521 can be manufactured from bamboo, wood products such as plywood, reinforced plastics such as glass filled nylon, polycarbonate, and the like.

In other embodiments, base rear support 521 is not integrally formed with base plate 520. In some examples, base rear support 521 can be formed from a different piece or type of material than base plate 520. In these embodiments, base rear support 521 can be secured to base 120 via one or more methodologies. For example, base rear support 521 can be welded directly or indirectly to base plate 520. Base rear support 521 can also be affixed directly or indirectly to base plate 520 using a chemical compound (e.g., a two-part epoxy). In still other examples, a hinge-type mechanism and the like can be used to attach base plate 520 and base rear support 521. In various examples, base rear support 521 can be removably coupled to base plate 520.

Figure 6:
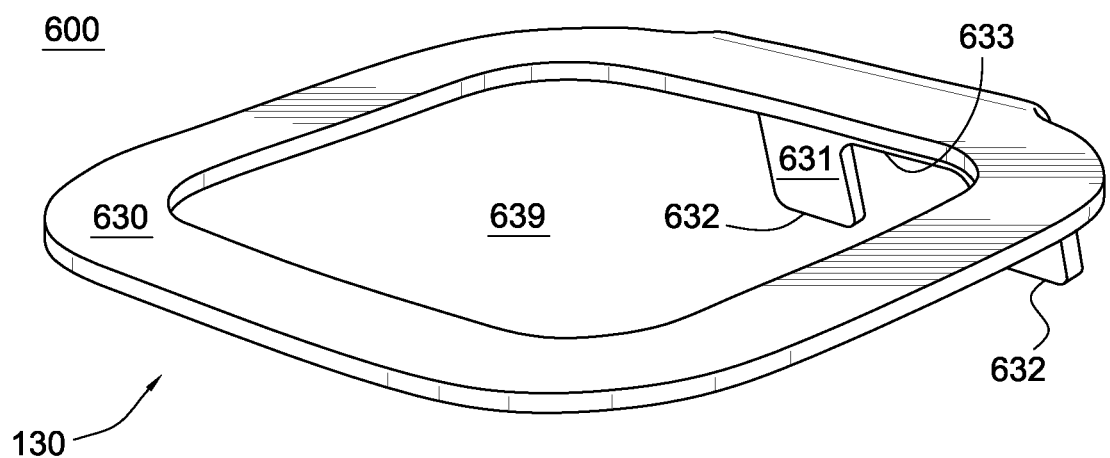
FIG. 6 is an isometric top-down view illustrating an embodiment of a top support portion of the exemplary systems of FIGS. 1-4, in accordance with the subject matter described herein.
Figure 7:
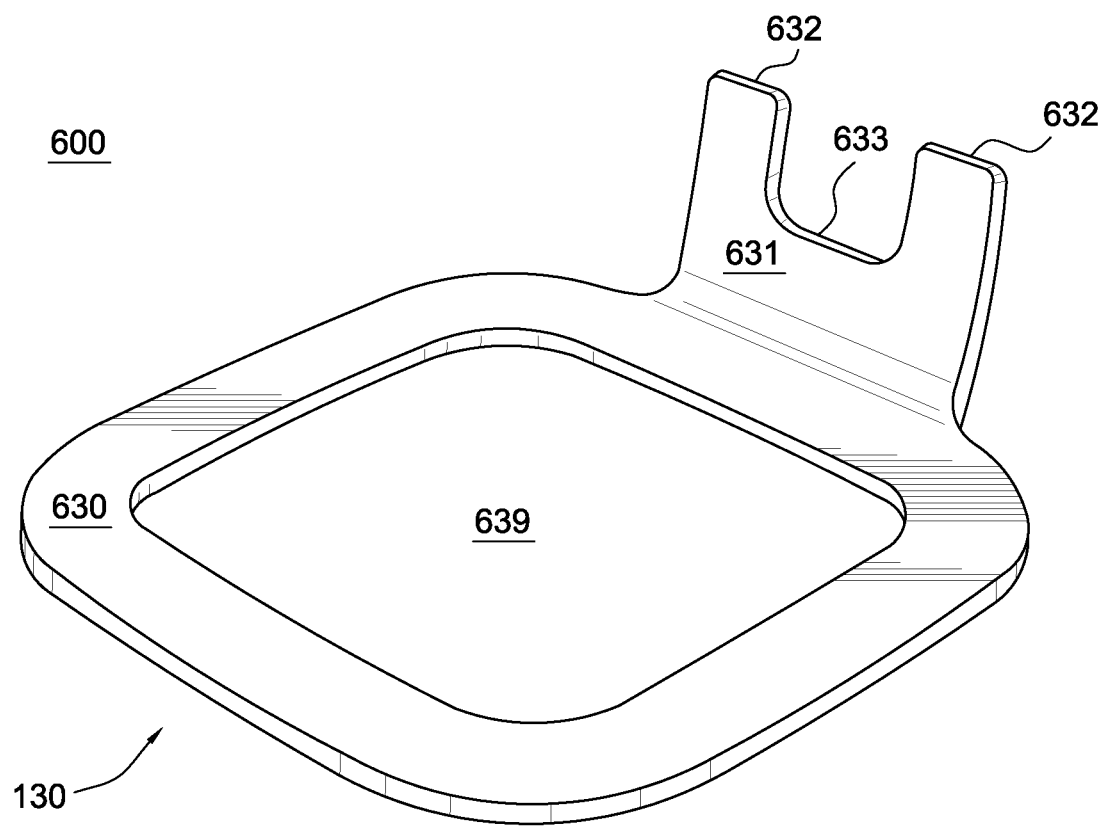
FIG. 7 is an isometric bottom-up view illustrating another embodiment of a top support portion of the exemplary systems of FIGS. 1-4, in accordance with the subject matter described herein.

FIG. 6 is an isometric top-down view illustrating an embodiment of a top support portion 600. FIG. 7 is an isometric bottom-up view illustrating another embodiment of a top support portion 600. Top support portion 600 is merely exemplary and is not limited to the embodiments presented herein. Top support portion 600 can be employed in many different embodiments or examples not specifically depicted or described herein.

In the embodiment illustrated in FIGS. 6 and 7, top support 130 is implemented as a portion of multi-piece stand 110 (described in FIGS. 1-4, above). Top support 130 can include (a) a top plate 630; and (b) a top rear support 631. Top rear support 631 can include: (a) two or more top support edges 632; and (b) at least one top securing edge 633 that are formed along the leading edge of top rear support 631 opposite top plate 630.

In many examples, top plate 630 can include at least one aperture 639. When a computing device is placed on top support 130, aperture 639 can expose portions of the underside of the computing device to ambient air may improve the overall thermal performance of the computing device. In some examples, aperture 639 can be sized and shaped such that when multi-piece stand 110 is disassembled, base plate 520 can be placed inside aperture 639. In some examples, aperture 639 is sized and shaped such that base plate 520 can fit snugly inside of aperture 639.

In the same or different examples, aperture 639 can have various shape and sizes. In other embodiments, top plate can include a cooling fan and/or other cooling mechanisms in addition to or instead of aperture 639. In addition, in some examples, top support 130 can also include support ring 335 (FIG. 3). Support ring 335 is configured to raise a computing device incrementally above the top surface of top plate 630.

In various embodiments, top rear support 631 can be configured as a downwardly angled flange of top plate 630. For example, top rear support 631 is configured as a flange that is downwardly angled at angle between approximately 100 and approximately 110 degrees, such as, at 105 degrees. Top support edges 632 can be spaced apart from each other such that a portion of connector collar 140 can be coupled to top securing edge 633 therebetween. For example, top rear support 631 can have a U-shape. In other examples, top rear support 631 can have other shapes.

Top rear support 631 can be configured to couple to connector collar 140 and top plate 630. For example, top rear support 631 can be configured so as to allow a mating of top support edges 632 to an associated base securing edge 523 while top securing edge 633 is mated to connector collar 140. In these embodiments, top rear support 631 is formed as a flange that is downwardly angled and having top securing edge 633 formed along, excised from and in physical communication with top support edges 632 so as to allow a mating with an upper portion of connector collar 140 (described in FIGS. 8 and 9, below).

In other examples, top support edges 632 can include a coupling mechanism (snaps, adhesive, pins, Velcro® material, protrusions, groove(s), etc.) that can be coupled to a complementary coupling mechanism on base 120 to secure top support 130 to base 120. Similarly, top securing edge 633 can include a coupling mechanism that can be coupled to a complementary coupling mechanism on connector collar 140.

In many embodiments, top rear support 631 is integrally formed with top plate 630. For example, top rear support 631 is formed from the same piece or type of material as top plate 630. Top support 130 can be manufactured to have various lengths and widths. In some embodiments, top support 130 has a length of 268 mm from the front of top support 130 to the back of top support 130, nearest connector collar 140. In some examples, a thickness of top support edges 632 and top securing edge 633 can be substantially similar or the same as a thickness of base support edges 522 and base securing edge 523.

In some embodiments, top plate 630 and top rear support 631 can be manufactured from any number of sheet or cast metals including sheet aluminum, sheet steel, die aluminum and the like. In other embodiments, top plate 630 and top rear support 631 can be manufactured from bamboo, wood products such as plywood, reinforced plastics such as glass filled nylon, polycarbonate, and the like.

In other embodiments, top rear support 631 is not integrally formed with top plate 630. In some examples, top rear support 631 can be formed from a different piece or type of material than top plate 630. In these embodiments, top rear support 631 can be secured to top support 130 via one or more methodologies. For example, top rear support 631 can be welded directly or indirectly to top plate 630. Top rear support 631 can also be affixed directly or indirectly to top plate 630 using a chemical compound (e.g., a two-part epoxy). In still other examples, a hinge-type mechanism and the like can be used to attach top plate 630 and top rear support 631. In various examples, top rear support 631 can be removably coupled to top plate 630.

Figure 8:
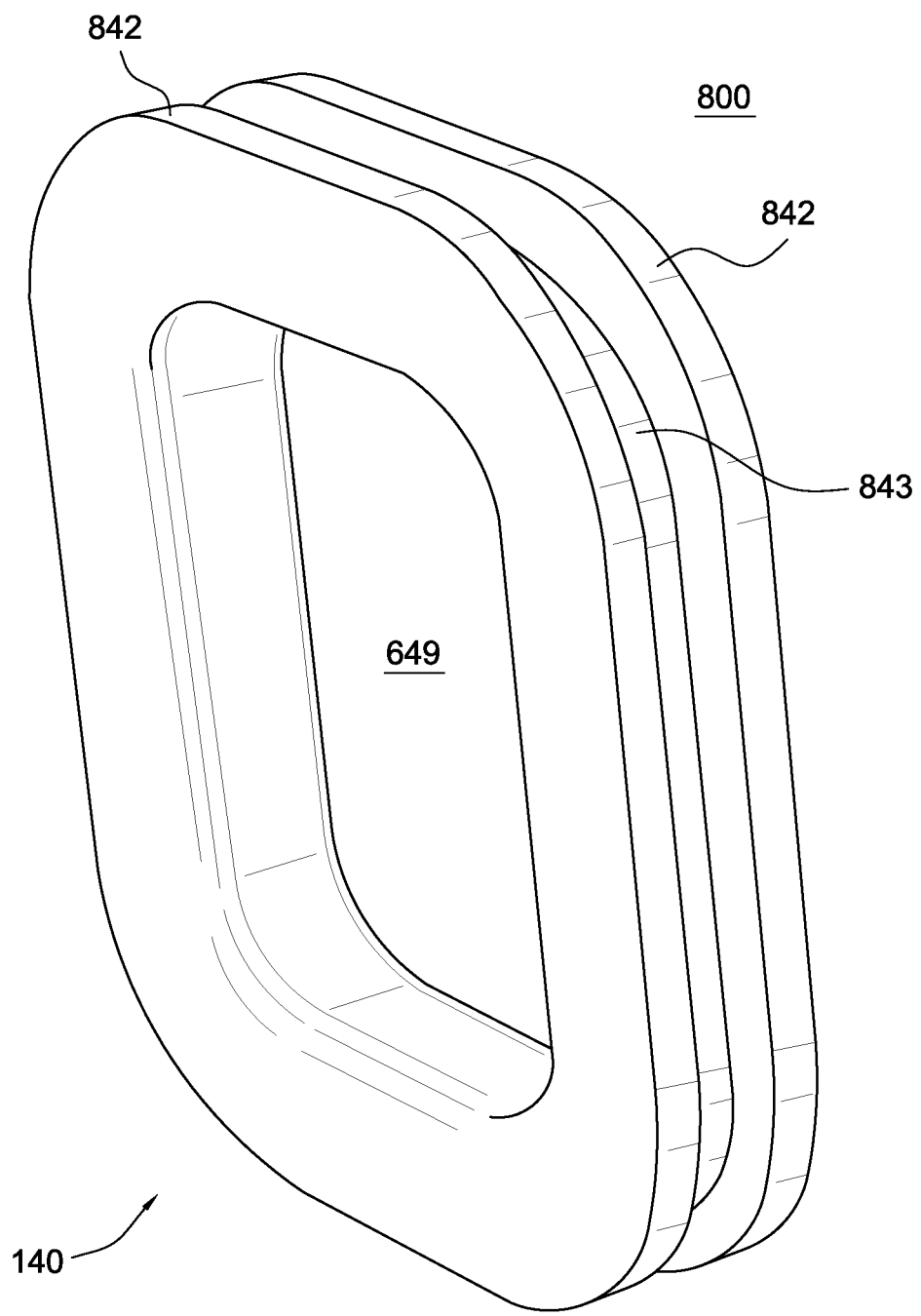
FIG. 8 is an isometric right-front view illustrating an embodiment of a connector collar portion of the exemplary systems of FIGS. 1-4, in accordance with the subject matter described herein.
Figure 9:
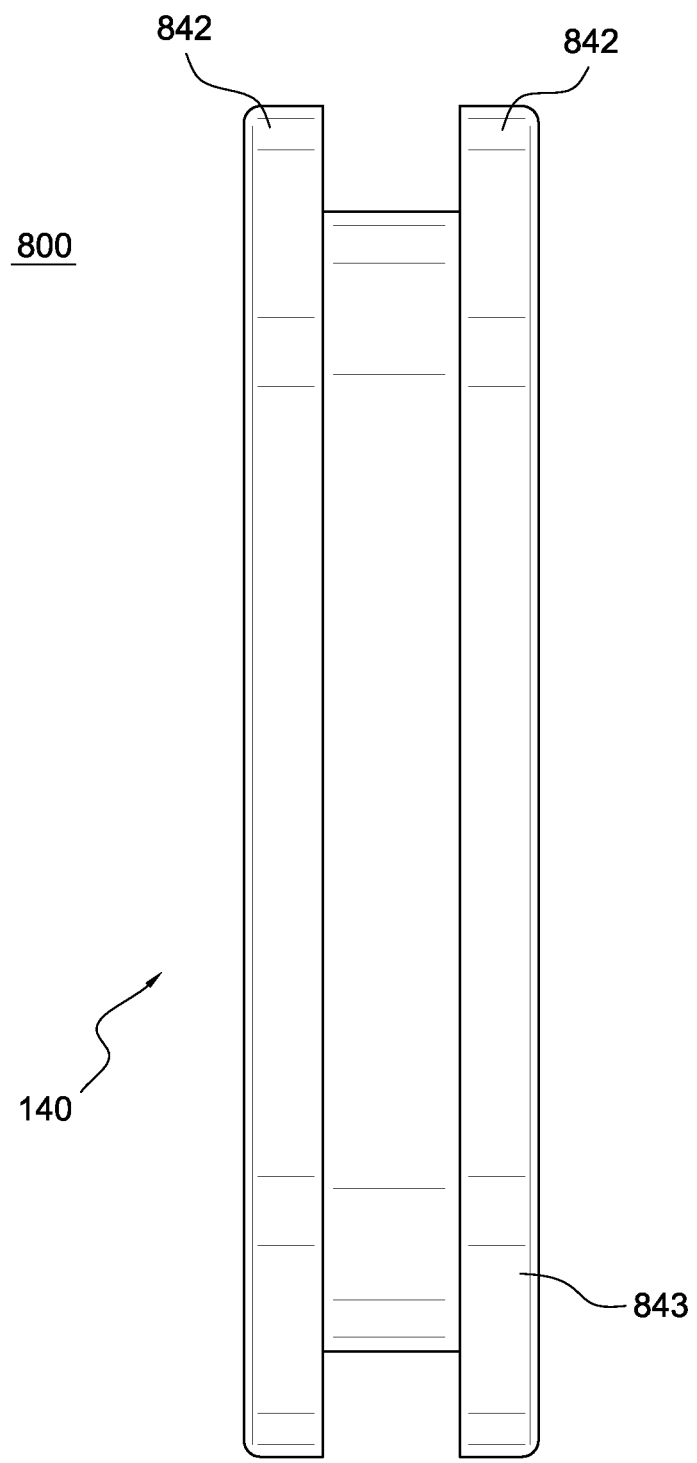
FIG. 9 is a side view illustrating another embodiment of connector collar portion of the exemplary systems of FIGS. 1-4, in accordance with the subject matter described herein.

FIG. 8 is an isometric right-front view illustrating an embodiment of a connector collar portion 800. FIG. 9 is a side view illustrating another embodiment of connector collar portion 800. Connector collar portion 800 is merely exemplary and is not limited to the embodiments presented herein. Connector collar portion 800 can be employed in many different embodiments or examples not specifically depicted or described herein.

In the embodiments illustrated in FIGS. 8 and 9, connector collar 140 is implemented as a portion of multi-piece stand 110 (described in FIGS. 1-4, above). Connector collar 140 can include: (a) two or more exterior support edges 842; and (b) at least one interior securing edge 843. In some examples, connector collar can also include an aperture 649 in the interior of connector collar 140. In other examples, connector collar 140 does not include an aperture 649. In some examples, connector collar 140 can have an O-shape. In other examples, connector collar 140 can have other shapes.

Exterior support edges 842 and interior securing edge 843 can be formed at least one channel. Exterior support edges 842 and the interior securing edge 843 can form at least one channel with interior securing edge 843 forming a trough of the at least one channel and exterior support edges 843 forming the two or more sides of the at least one channel. In some examples, exterior support edges 842 can be formed along the leading edge of connector collar 140 by hollowing out the material between each of the exterior support edges 842 to form a channel defining interior securing edge 843. In some examples, the width of interior support edge can be greater than a thickness of base securing edge 523 (FIG. 5) and top securing edge 633 (FIGS. 6 and 7). In some examples, connector collar 140 is configured such that base securing edge 523 and top securing edge 633 fit snugly in the channel formed by exterior support edges 842 and interior securing edge 843.

In some embodiments, connector collar 140 can be manufactured from cast metal or molded plastic or any such other suitable materials. Examples of cast metals include die cast zinc, die cast aluminum and the like. Examples of molded plastic include polycarbonate and glass-filled plastics, such as glass-filled nylon or polycarbonate plastic and the like.

In some embodiments, a top portion of connector collar 140 is configured so that the top portion of interior securing edge 843 can mate to an associated top securing edge 633 (FIGS. 6 and 7) of an associated top support 130. A bottom portion of connector collar 140 can be configured so that a bottom portion of interior securing edge 843 can mate to an associated base securing edge 523 (FIG. 5) of an associated base plate 520. In these embodiments, exterior support edges 842 are configured to envelop the associated portions of top rear support 631 (FIGS. 6 and 7) and base rear support 521 (FIG. 5).

Referring to FIGS. 5-9, in operation, interior securing edge 843 at the top of connector collar 140 is seated against top securing edge 633 and exterior support edges 842 is located around the associated edges of top rear support 631. Similarly, interior securing edge 843 at the bottom of connector collar 140 is seated against base securing edge 523 and exterior support edges 842 is located around the associated edges of base rear support 521.

Figure 10:
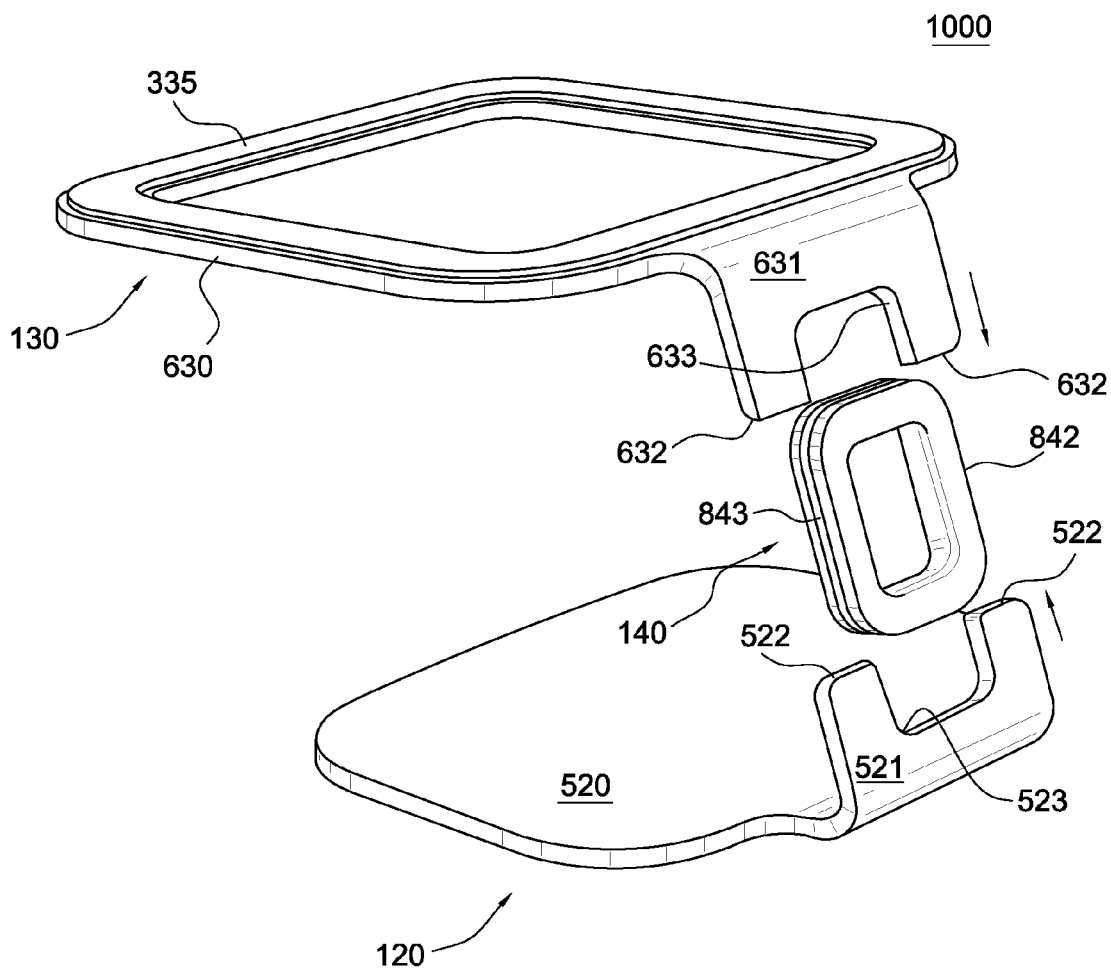
FIG. 10 is a three-quarter rear view illustrating yet another embodiment of an exemplary system, in accordance with the subject matter described herein.

FIG. 10 is a three-quarter rear view illustrating an embodiment of an exemplary system 1000 for supporting a mobile computing device (not shown). FIG. 10 details a portion of the method of assembling system 1000 from its component parts (i.e., base 120, top support 130, and connector collar 140). As illustrated in FIG. 10, base plate 520 of base 120 is placed on a surface and interior securing edge 843 of a bottom portion of connector collar 140 is seated against base securing edge 523 while exterior support edges 842 is located around the associated interior edges of base rear support 521. In some embodiments, a top securing edge 633 of top support 130 is then mated to interior securing edge 843 of the top portion of connector collar 140 allowing exterior support edges 842 to form around the associated interior edges of top rear support 631. In this embodiment, as top securing edge 633 of top support 130 is mated and seated to interior securing edge 843 of the top portion of connector collar 140, top support edges 632 are mated to associated base support edges 522 to provide support for top support 130 and the associated mobile device (not shown) to be placed on support ring 335 of top plate 630 of top support 130.

Figure 13:
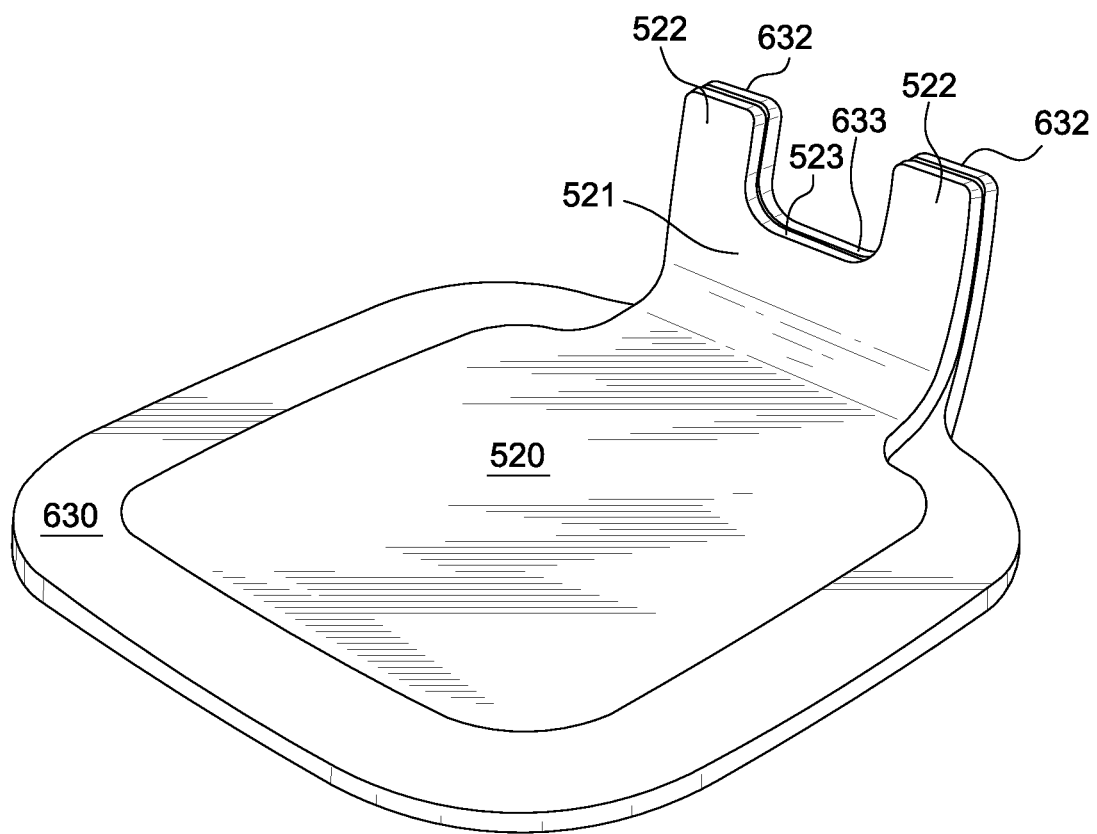
FIG. 13 is an isometric view illustrating a base plate located in an aperture of a top plate of the exemplary systems of FIGS. 1-4, in accordance with the subject matter described herein.

Furthermore, when multi-piece stand 110 is disassembled, multi-piece stand 110 can easily be transported with the computing device. That is, multi-piece stand 110 is configured to be placed in a compact, travel configuration. Top plate 630 is configured such that top plate 630 is coupleable to base plate 520 by placing base plate 520 in the aperture 639. In some examples, as shown in FIG. 13, when multi-piece stand 110 is disassembled, base plate 520 can be placed in aperture 639, and base rear support 521 and top rear support 631 can be abutting or near each other to form a compact travel form. That is, multi-piece stand 110 is relatively flat and can easily be packaged in a bag to be carried with the computing device. Traditional stands for mobile computing device 105 (FIGS. 1-2) lack this portability feature.

Figure 11:
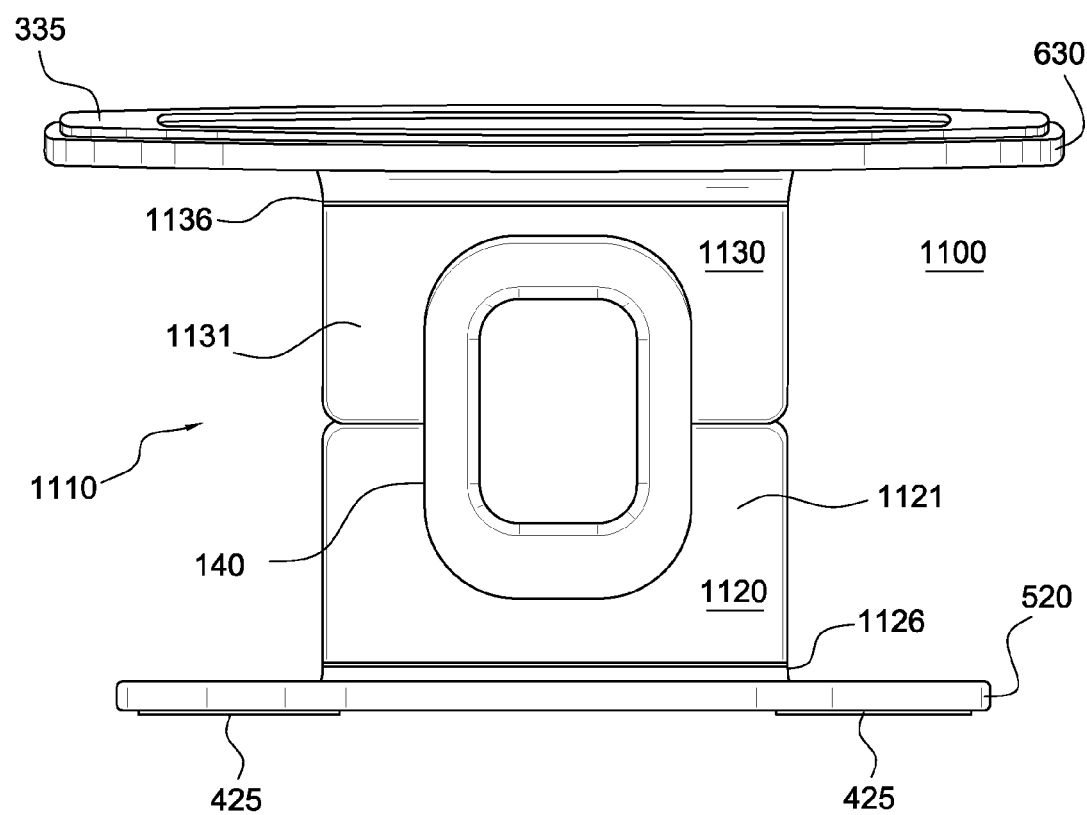
FIG. 11 is a frontal view illustrating an embodiment of an exemplary system, in accordance with the subject matter described herein.

FIG. 11 is a frontal view illustrating an embodiment of an exemplary system, in accordance with the subject matter described herein. Multi-piece stand 1110 is merely exemplary and is not limited to the embodiments presented herein. Multi-piece stand 1110 can be employed in many different embodiments or examples not specifically depicted or described herein.

In the embodiment illustrated in FIG. 11, multi-piece stand 1110 includes: (a) a base 1120; (b) a top support 1130; and (c) a connector collar 140. In operation, multi-piece stand 1110 is configured to support a mobile computing device (not shown) by placing base 1120 onto a supporting surface (i.e., a desktop), mechanically coupling connector collar 140 to a portion of base 1120 and mechanically coupling a portion of top support 1130 to another portion of connector collar 140. After assembling multi-piece stand 1110, computing device can be placed on top support 1130.

Base 1120 can include: (a) a base plate 520; (b) a base rear support 1121; and (c) a hinge 1126 hingedly coupling base plate 520 and base rear support 1121. Top support 1130 can include (a) a top plate 630; (b) a top rear support 1131; and (c) a hinge 1136 coupling top plate 630 to top rear support 1131.

In some examples, hinges 1126 and 1136 can be locked in place while multi-piece stand 1110 is being used to support a computing device. In some examples, when multi-piece stand 1110 is disassembled, hinges 1126 can be used to rotate base rear support 1121 such that at least a portion of rear support 1121 can rest on or substantially parallel to base plate 520. Similarly, when multi-piece stand 1110 is disassembled, hinges 1136 can be used to rotate top rear support 1131 such that at least a portion of top rear support 1131 can rest on or substantially parallel to top plate 630. Accordingly, multi-piece stand 1110 is easily portable. That is, base 1120 and top support are relatively flat and can easily be package in a bag to be carried with the computing device. Traditional stands for computing device lack this portability feature.

Figure 12:
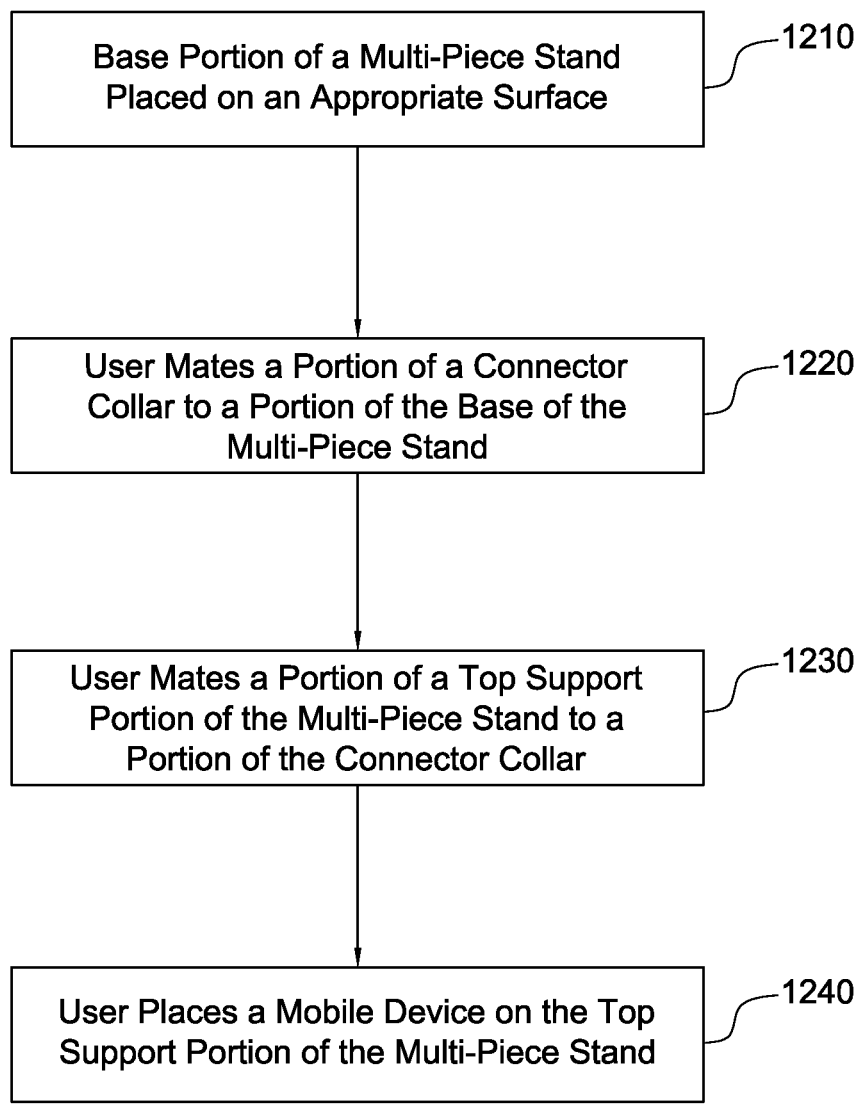
FIG. 12 illustrates a flow chart for an embodiment of a method of using configuring a mobile device stand.

FIG. 12 illustrates a flow chart for an embodiment of a method 1200 of using configuring a mobile device stand. Method 1200 is merely exemplary and is not limited to the embodiments presented herein. Method 1200 can be employed in many different embodiments or examples not specifically depicted or described herein. In some embodiments, the activities, the procedures, and/or the processes of method 1200 can be performed in the order presented. In other embodiments, the activities, the procedures, and/or the processes of the method 1200 can be performed in any other suitable order. In still other embodiments, one or more of the activities, the procedures, and/or the processes in method 1200 can be combined or skipped. In some embodiments, method 1200 is implemented with components of FIGS. 1-10, above.

Method 1200 of FIG. 12 begins with an activity 1210 where a base portion of a multi-piece stand being placed on an appropriate surface. In some embodiments, a user places a base portion of a multi-piece stand on a flat surface, such as, for example the surface of a desk, a table, an airline tray, and the like. For example, a user can place base 120 of multi-piece stand 110 of FIGS. 1-5 and 10 on a surface.

Method 1200 in FIG. 12 continues with an activity 1220 of the user mating a portion of a connector collar to a portion of the base of the multi-piece stand. In some embodiments, a user mates the lower portion of a connector collar to a base securing edge portion of the base. In these embodiments, mating the lower portion of a connector collar to the base securing edge of a portion of the base of the multi-piece stand allows the interior securing edge of the bottom portion of connector collar to sit against the base securing edge and further allows the exterior support edges of the bottom portion of the connector collar to be located around the associated edges of the base rear support. For example, as shown in FIGS. 1-4 and 10, mating the lower portion of connector collar 140 to base securing edge 523 of base 120 of multi-piece stand 110 allows interior securing edge 843 of the bottom portion of connector collar 140 to sit against base securing edge 523 and further allows exterior support edges 842 of the bottom portion of connector collar 140 to be located around the associated edges of base rear support 521.

Subsequently, method 1200 of FIG. 12 includes an activity 1230 of the user mating a portion of a top support portion of the multi-piece stand to a portion of the connector collar of the multi-piece stand. In some embodiments, a user mates a top securing edge portion of the top support to an upper portion of the connector collar. In these embodiments, mating the top securing edge portion of the top support to the upper portion of the connector collar allows the interior securing edge of the upper portion of connector collar to seat against the top securing edge of the top support and further allows the exterior support edges of the upper portion of the connector collar to be located around the associated edges of the top rear support. Further to these embodiments, mating the top securing edge portion of the top support to the upper portion of the connector collar allows the top support edges of the top support to mate to associated base support edges and provide support for the top support and the associated mobile device to be placed on a support ring portion of the top support.

For example, referring to FIGS. 1-4 and 10, mating the top securing edge portion of top support 130 of multi-piece stand 110 to the upper portion of connector collar 140 of multi-piece stand 110 allows interior securing edge 843 of the upper portion of connector collar 140 to sit against top securing edge 633 of top support 130 and further allows exterior support edges 842 of the upper portion of connector collar 140 to be located around the associated edges of top rear support 631. Further to these embodiments, mating the top securing edge portion of top support 130 to the upper portion of connector collar 140 allows top support edges 632 of top support 130 to mate to associated base support edges 522 and provide support for top support 130 and the associated mobile device to be placed on support ring 335 of top support 130.

Next, method 1200 of FIG. 12 includes an activity 1240 of a user placing a mobile device on the top support portion of the multi-piece stand. In an example and referring to FIGS. 1-3 above, a user places mobile computing device 105 on top support 130 of multi-piece stand 110.

Although aspects of the subject matter described herein have been described with reference to specific embodiments, it will be understood by those skilled in the art that various changes may be made without departing from the scope of the subject matter described herein. Accordingly, the disclosure of embodiments is intended to be illustrative of the scope of the subject matter described herein and is not intended to be limiting. It is intended that the scope of the subject matter described herein shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A portable computing device stand comprising:
a base including at least three side edges and a first folded edge opposed to the at least three side edges of the base and extending outward from the base, the first folded edge defining a base rear support that includes a first cutout portion, the first folded edge including two or more base supporting edge portions and a base securing edge portion, the base securing edge portion defined by the first cutout portion of the base rear support;
a top support including at least three side edges and a second folded edge opposed to the at least three side edges of the top support and extending outward from the top support, the second folded edge defining a top rear support that includes a second cutout portion, the second folded edge including two or more top support edge portions and a top securing edge portion, the top securing edge portion defined by the second cutout portion of the top rear support; and
a connection collar including a top portion and a bottom portion, the bottom portion of the connection collar configured to couple to the first cutout portion of the base, the top portion of the connection collar configured to couple to the second cutout portion of the top support, the connection collar configured to include an exterior leading edge defining a circumference of the connection collar, the exterior leading edge having an interior securing edge portion configured to abut the base securing edge portion of the base and the top securing edge portion of the top support, the exterior leading edge additionally having two or more exterior support edge portions that extend away from the interior securing edge portion and are configured to be located around a part of the first folded edge and a part of the second folded edge, wherein:
the connector collar is configured to be detachable from the top support; and
the connector collar is configured to be detachable from the base.

2. The portable computing device stand of claim 1, wherein the top support comprises a substantially flat ring; and the substantially flat ring has a ring cutout portion at a center portion of the substantially flat ring.

3. The portable computing device stand of claim 2, wherein the substantially flat ring has a rectangular shape.

4. The portable computing device stand of claim 1, wherein the base additionally includes an upper surface and a lower surface opposite the upper surface; the upper surface and the lower surface of the base are adjacent to the at least three side edges of the base; the lower surface of the base is coupled to two or more support pads.

5. The portable computing device stand of claim 1, wherein the base rear support is configured at an angle in a range of approximately 70 degrees to approximately 80 degrees with respect to one or more edges of the at least three side edges of the base.

6. The portable computing device stand of claim 1, wherein the top support additionally includes a support ring, an upper surface, and a lower surface opposite the upper surface; the upper surface and the lower surface of the top support are adjacent to the at least three side edges of the top support; the upper surface of the top support is coupled to the support ring.

7. The portable computing device stand of claim 1, wherein the top rear support is configured at an angle in a range of approximately 100 degrees to approximately 110 degrees with respect to one or more edges of the at least three side edges of the top support.

8. The portable computing device stand of claim 1, wherein the base and the top support comprise at least one of: sheet aluminum, sheet steel, die aluminum, bamboo, a wood product, a reinforced plastic, or a polycarbonate.

9. The portable computing device stand of claim 1, wherein the connection collar comprises at least one of: die cast zinc, die cast aluminum, a polycarbonate, a thermoplastic polyurethane, or a glass-filled plastic.

10. The portable computing device stand of claim 1, wherein the top support is configured to support a portable computing device.

11. The portable computing device stand of claim 1, wherein the first folded edge is in addition to the at least three side edges of the base.

12. A computing device accessory for a computing device, the computing device accessory comprising:
   a base, the base comprising:
      a base plate configured to rest on a surface; and
      a base rear support coupled to the base plate at a first angle;
   a top support, the top support comprising:
      a top plate; and
      a top rear support coupled to the top plate at a second angle; and
   a connector collar configured to removably couple to the base rear support of the base and the top rear support of the top support, wherein:
   the top support is configured to support the computing device such that the computing device is operable by a user when the base plate rests on the surface, and the base rear support of the base and the top rear support of the top support are coupled to the connector collar;
   the top plate has a first aperture configured to receive the base plate of the base;
   the base plate is further configured such that the base plate can be located in the first aperture in the top plate of the top support with the base rear support abutting the top rear support; and
   a size and a shape of the first aperture of the top plate is approximately identical to a size and a shape of the base plate.

13. The computing device accessory of claim 12, wherein the connector collar comprises:
      two or more exterior support edges; and
      at least one interior securing edge, wherein:
   the two or more exterior support edges and the at least one interior securing edge form at least one channel with the at least one interior securing edge forming a trough of the at least one channel and the two or more exterior support edges forming two or more sides of the at least one channel.

14. The computing device accessory of claim 13, wherein the top rear support comprises:
      two or more top support edges; and
      at least one top securing edge, wherein:
   the at least one top securing edge is configured to be placed inside of the at least one channel when the connector collar is coupled to the top rear support of the top support.

15. The computing device accessory of claim 13, wherein the base rear support comprises:
      two or more base support edges; and
      at least one base securing edge, wherein:
   the at least one base securing edge is configured to be placed inside of the at least one channel when the connector collar is coupled to the base rear support of the base.

16. The computing device accessory of claim 12, wherein the top support further comprise a hinge hingedly coupling the top plate to the top rear support such that the top rear support is rotatable such that a portion of the top rear support can rest on the top plate.

17. The computing device accessory of claim 12, wherein the base further comprise a hinge hingedly coupling the base plate to the base rear support such that the base rear support is rotatable such that a portion of the base rear support can rest on the base plate.

18. The computing device accessory of claim 12, wherein the first angle is between approximately 70 degrees and approximately 80 degrees; and the second angle is between approximately 100 degrees and approximately 110 degrees.

19. A method of using a portable computing device stand, the portable computing device stand comprising a base, a top support, and a connector collar, the base comprising a base plate and a base rear support coupled to the base plate at a first angle, the top support comprising a top plate and a top rear support coupled to the top plate at a second angle, the method comprising:
   placing the base plate of the base on a flat surface;
   mating a first portion of the connector collar of the portable computing device stand to the base rear support of the base of the portable computing device stand;
   mating the top rear support of the top support of the portable computing device stand to a second portion of the connector collar of the portable computing device stand;
   placing a mobile computing device on the top plate of the top support of the portable computing device stand;
   removing the mobile computing device from the top plate of the top support of the portable computing device stand;
   detaching the first portion of the connector collar of the portable computing device stand from base rear support of the base of the portable computing device stand;
   detaching the top rear support of the top support of the portable computing device stand from the second portion of the connector collar of the portable computing device stand; and
   placing the base plate of the base of the portable computing device stand into a first aperture in the top plate of the top support of the portable computing device stand, wherein;
   a size and a shape of the first aperture of the top plate of the top support of the portable computing device stand is approximately identical to a size and a shape of the base plate of the base of the portable computing device stand.

20. The portable computing device stand of claim 1, wherein:
   the base further comprises a base plate adjacent to the first folded edge;
   the top support comprises an aperture configured to receive the base plate when the bottom portion of the connection collar is not coupled to the first cutout portion of the base and the top portion of the connection collar is not coupled to the second cutout portion of the top support; and
   a size and a shape of the base plate is approximately the same as a size and a shape of the aperture of the top support.

21. The portable computing device stand of claim 20, wherein:
   the top support is configured such that the first folded edge is adjacent to the second folded edge when the base plate is located within the aperture of the top support.

22. The method of claim 19, wherein the first angle is between approximately 70 degrees and approximately 80 degrees; and the second angle is between approximately 100 degrees and approximately 110 degrees.

* * * * *